(12) United States Patent
Bae

(10) Patent No.: US 12,150,608 B2
(45) Date of Patent: Nov. 26, 2024

(54) MOBILE ROBOT

(71) Applicant: LG ELECTRONICS INC., Seoul (KR)

(72) Inventor: Yonghwan Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 17/786,999

(22) PCT Filed: Dec. 20, 2019

(86) PCT No.: PCT/KR2019/018254
§ 371 (c)(1),
(2) Date: Jun. 17, 2022

(87) PCT Pub. No.: WO2021/125411
PCT Pub. Date: Jun. 24, 2021

(65) Prior Publication Data
US 2023/0022860 A1   Jan. 26, 2023

(51) Int. Cl.
*A47L 11/40*   (2006.01)
*G05D 1/00*   (2006.01)

(52) U.S. Cl.
CPC ........ *A47L 11/4038* (2013.01); *G05D 1/0066* (2013.01); *G05D 1/0246* (2013.01); *A47L 2201/04* (2013.01); *A47L 2201/06* (2013.01)

(58) Field of Classification Search
CPC ............. A47L 11/4038; A47L 11/4069; A47L 11/4011; A47L 2201/04; A47L 2201/06; G05D 1/0066; G05D 1/0246; G05D 1/0214; G05D 1/0253; G05B 15/02; G05B 2219/45098; B25J 9/12; B25J 9/1666; B25J 11/0085; B25J 13/089; B25J 19/02
See application file for complete search history.

(56) References Cited

U.S. PATENT DOCUMENTS

| 2012/0321759 A1* | 12/2012 | Marinkovich | A61B 5/442 356/402 |
| 2013/0333153 A1* | 12/2013 | Sung | A47L 9/22 901/14 |
| 2016/0235270 A1* | 8/2016 | Santini | A47L 11/4041 |

(Continued)

FOREIGN PATENT DOCUMENTS

| CN | 105496314 A | 4/2016 |
| CN | 106264357 A | 1/2017 |

(Continued)

*Primary Examiner* — Khoi H Tran
*Assistant Examiner* — Nhi Q Bui
(74) *Attorney, Agent, or Firm* — Birch, Stewart, Kolasch & Birch, LLP

(57) ABSTRACT

The present disclosure provides a mobile robot. The mobile robot includes a body, a pair of spin mops rotatably mounted to the body, a mop motor configured to provide a driving force to the pair of spin mops, an optical flow sensor configured to obtain bottom-view image information using light at a regular time interval, and a controller configured to determine whether the material of the floor is a troublesome material based on the bottom-view image information sensed by the optical flow sensor and to control, upon determining that the material of the floor is a troublesome material, the mop motor to perform an entry restriction operation.

19 Claims, 9 Drawing Sheets

(56) References Cited

U.S. PATENT DOCUMENTS

| | | | |
|---|---|---|---|
| 2018/0199781 A1* | 7/2018 | Hillen | G01N 21/4738 |
| 2018/0213992 A1 | 8/2018 | Koetz et al. | |
| 2019/0239710 A1 | 8/2019 | Lee et al. | |
| 2020/0000302 A1* | 1/2020 | Morin | A47L 11/4088 |
| 2020/0033878 A1* | 1/2020 | Watanabe | G05D 1/0246 |
| 2020/0077858 A1* | 3/2020 | Zhang | A47L 11/4061 |
| 2020/0225673 A1* | 7/2020 | Ebrahimi Afrouzi | G06N 5/04 |
| 2020/0379478 A1* | 12/2020 | Shin | G05D 1/0238 |
| 2021/0228050 A1* | 7/2021 | Zhang | A47L 11/28 |

FOREIGN PATENT DOCUMENTS

| | | |
|---|---|---|
| CN | 106998985 A | 8/2017 |
| CN | 109846427 A | 6/2019 |
| KR | 10-2009-0098513 A | 9/2009 |
| KR | 10-2012-0055891 A | 6/2012 |
| KR | 10-2014-0011216 A | 1/2014 |
| KR | 10-2018-0094718 A | 8/2018 |
| KR | 10-2019-0015930 A | 2/2019 |
| KR | 10-2019-0108358 A | 9/2019 |
| KR | 10-2019-0134926 A | 12/2019 |
| TW | 201705892 A | 2/2017 |
| WO | WO 2018/135901 A1 | 7/2018 |
| WO | WO 2018/216690 A1 | 11/2018 |

\* cited by examiner

MOBILE ROBOT

CROSS REFERENCE TO RELATED APPLICATIONS

This application is the National Phase of PCT International Application No. PCT/KR2019/018254, filed on Dec. 20, 2019, which is hereby expressly incorporated by reference into the present application.

TECHNICAL FIELD

The present invention relates to a mobile robot capable of performing a mopping operation.

BACKGROUND ART

A robot cleaner is an apparatus that cleans a floor by suctioning foreign matter, such as dust, from the floor or sweeping away foreign matter on the floor. In recent years, there have been developed cleaners capable of performing a mopping operation. Further, a robot cleaner is an apparatus that performs cleaning while traveling autonomously.

As a conventional art (Korean Patent Registration No. 10-1654014), a robot cleaner capable of moving using the surface of a mop is known. In this conventional art, the robot cleaner includes a first rotating member and a second rotating member, which fix the surfaces of a pair of mops arranged in a leftward-rightward direction. In the robot cleaner according to the conventional art, the first rotating member and the second rotating member are removably coupled to the body of the robot.

However, the robot cleaner of the conventional art does not have a function of detecting the material of the floor, and is thus incapable of controlling travel depending on the material of the floor. For example, when a cleaner performing a mopping operation travels on a carpet or the like, there occurs a problem in that the cleaner becomes incapable of leaving the carpet.

Further, because the robot cleaner of the conventional art is not capable of detecting a carpet or the like, it may undesirably move onto a carpet. At this time, a mop of the robot cleaner may catch on the carpet, which results in trouble with a mopping mechanism. Furthermore, the robot cleaner of the conventional art may not travel properly on the carpet, which results in an increase in cleaning time.

There is another type of conventional mobile robot, which is provided with a cliff sensor for detecting a stepped portion of a floor and controls travel based on the result of detection. However, this conventional mobile robot is not capable of detecting the material of the floor either, and thus has the problems mentioned above.

RELATED ART DOCUMENTS

Patent Documents

Korean Patent Registration No. 10-1654014 (registered on Aug. 30, 2016)

DISCLOSURE

Technical Problem

It is an object of the present invention to provide a mobile robot capable of accurately detecting the material of a floor, thereby avoiding entering a region in which wet mopping is impossible or from which it is difficult for the cleaner, which travels using the rotational force of a mop, to escape due to the material characteristics thereof.

It is another object of the present invention to extract an image quality value, the reflectance of a floor, and a frame rate from bottom-view image information, which is obtained by an optical flow sensor used to detect the movement of a mobile robot, and to determine the material of the floor based thereon, thereby enabling the mobile robot to avoid a troublesome region.

It is still another object of the present invention to determine the material of a floor based on information on the load of a spin mop, acceleration information, and information obtained by a cliff sensor when it is not possible to completely determine the material of the floor based on floor image information, thereby enabling a mobile robot to avoid a troublesome region.

It is still another object of the present invention to determine the material of a floor based on floor image information, information on the load of a spin mop, acceleration information, and information obtained by a cliff sensor, thereby enabling a mobile robot to avoid a troublesome region.

It is still another object of the present invention to determine a troublesome region, such as a carpet, proactively before a spin mop moves onto the troublesome region by disposing a cliff sensor and an optical flow sensor at positions further forward than the spin mop, thereby preventing a mobile robot from traveling on the troublesome region.

Technical Solution

In order to accomplish the above and other objects, a mobile robot according to the present invention detects the material of a floor based on an image of the floor, and travels based on the detected material of the floor.

In addition, a mobile robot according to the present invention detects the material of a floor based on at least one of an image quality value, a frame rate, or the reflectance of the floor, which is extracted from an image of the floor, and travels based on the detected material of the floor.

In addition, a mobile robot according to the present invention detects the material of a floor by comprehensively determining an image of the floor, acceleration, a mop load, and information output from a cliff sensor, and travels based on the detected material of the floor.

Specifically, a mobile robot according to the present invention includes a body, a pair of spin mops rotatably mounted to the body, a mop motor configured to provide a driving force to the pair of spin mops, an optical flow sensor configured to obtain bottom-view image information using light at a regular time interval, and a controller configured to determine whether the material of the floor is a troublesome material based on the bottom-view image information sensed by the optical flow sensor and to control, upon determining that the material of the floor is a troublesome material, the mop motor to perform an entry restriction operation.

The optical flow sensor may be disposed further forwards than the pair of spin mops.

The optical flow sensor may include an image sensor configured to capture a bottom-view image to obtain the bottom-view image information and at least one light source configured to adjust the quantity of light.

The controller may calculate an image quality value of the bottom-view image based on the bottom-view image information, and when the image quality value is smaller than a predetermined reference image quality value, may determine that the material of the floor is a troublesome material.

The image quality value may be determined based on the shape of an image formed on the floor by light emitted from the light source.

The controller may calculate a frame rate of the bottom-view image based on the bottom-view image information, and when the frame rate is lower than a predetermined reference frame rate, may determine that the material of the floor is a troublesome material.

The controller may calculate a reflectance value of the floor based on the bottom-view image information, and when the reflectance value of the floor is smaller than a predetermined reference reflectance value, may determine that the material of the floor is a troublesome material.

The controller may calculate, based on the bottom-view image information, the reflectance value of the floor, the image quality value of the bottom-view image, and the frame rate of the bottom-view image, and may determine that the material of the floor is a troublesome material when at least one of Conditions 1 to 3 below is satisfied.

In addition, the mobile robot according to the present invention may further include a camera configured to obtain top-view image information at a regular time interval, and the controller may detect the current location based on the top-view image information.

Upon determining that the material of the floor is a troublesome material, the controller may set the current location as a troublesome region.

In addition, the mobile robot according to the present invention may further include a mop load information sensor configured to sense a load value of the mop motor. When the load value of the mop motor is larger than a predetermined reference load value, the controller may control the mop motor to perform the entry restriction operation.

In addition, the mobile robot according to the present invention may further include a cliff sensor configured to sense the distance to the floor. When the distance to the floor is less than a reference distance value, the controller may control the mop motor to perform the entry restriction operation.

The cliff sensor may be disposed further forwards than the pair of spin mops.

The cliff sensor may be disposed such that at least a portion thereof overlaps an imaginary central vertical plane in a vertical direction.

In addition, the mobile robot according to the present invention may further include an acceleration sensor mounted to the body to sense acceleration values. The controller may calculate an average acceleration value based on the acceleration values, and, upon determining that the average acceleration value is larger than a reference average acceleration value, may control the mop motor to perform the entry restriction operation.

In addition, the mobile robot according to the present invention may further include an acceleration sensor mounted to the body to sense acceleration values. The controller may calculate dispersion of the acceleration values, and, upon determining that the dispersion is greater than reference dispersion, may control the mop motor to perform the entry restriction operation.

In addition, the mobile robot according to the present invention may further include a mop load information sensor configured to sense a load value of the mop motor, a cliff sensor configured to sense the distance to the floor, and an acceleration sensor mounted to the body to sense acceleration values. When at least one of Conditions 4 to 7 below is satisfied, the controller may control the mop motor to perform the entry restriction operation.

In addition, a mobile robot according to the present invention includes a body, a pair of spin mops rotatably mounted to the body, a mop motor configured to provide a driving force to the pair of spin mops, an optical flow sensor configured to obtain bottom-view image information using light at a regular time interval, an acceleration sensor mounted to the body to sense acceleration values, a cliff sensor configured to sense the distance to the floor, a mop load information sensor configured to sense a load value of the mop motor, and a controller configured to determine whether the material of the floor is a troublesome material based on information received from at least one of the optical flow sensor, the acceleration sensor, the cliff sensor, or the mop load information sensor and to control, upon determining that the material of the floor is a troublesome material, the mop motor to perform an entry restriction operation.

The optical flow sensor may be disposed at a position further forward than a line connecting the rotation axes of the pair of spin mops so as not to vertically overlap the pair of spin mops, and the cliff sensor may be disposed further forwards than the front ends of the pair of spin mops and the optical flow sensor.

The pair of spin mops may be disposed to be bilaterally symmetrical to each other with respect to an imaginary central vertical plane, and the optical flow sensor and the cliff sensor may be disposed so as to vertically overlap the imaginary central vertical plane.

Advantageous Effects

As is apparent from the above description, according to the present invention, the mobile robot determines troublesome region based on an image of the floor, and travels while avoiding the same. Accordingly, it is possible to solve the problem in which the mobile robot, which travels using the rotational force of the mop, moves onto a carpet and is caught thereon.

In addition, the material of the floor is estimated using at least one of the reflectance of the floor, the image quality of the floor, the load of the spin mop, or acceleration, obtained by multiple sensors, or using combinations of these factors. Accordingly, it is possible to accurately determine the material of the floor and to enable the mobile robot to avoid a troublesome region before entering the same or to leave the troublesome region at the beginning of entry into the same.

In addition, the cliff sensor and the optical flow sensor are capable of not only detecting a cliff and the amount of movement of the mobile robot but also simultaneously determining the material of the floor. Accordingly, it is not necessary to mount a separate sensor, and it is possible to reduce manufacturing costs and to easily form the control configuration.

In addition, since the cliff sensor and the optical flow sensor are disposed further forwards than the mop module, it is possible to avoid a carpet proactively before a larger amount of load is applied to the mop module by the carpet.

In addition, since a sensor for determining the material of the floor is disposed at the center of the body in the leftward-rightward direction, it is possible to increase the detection range to the maximum extent with a minimum number of sensors.

DETAILED DESCRIPTION OF THE PREFERRED EMBODIMENTS

Figure 1:
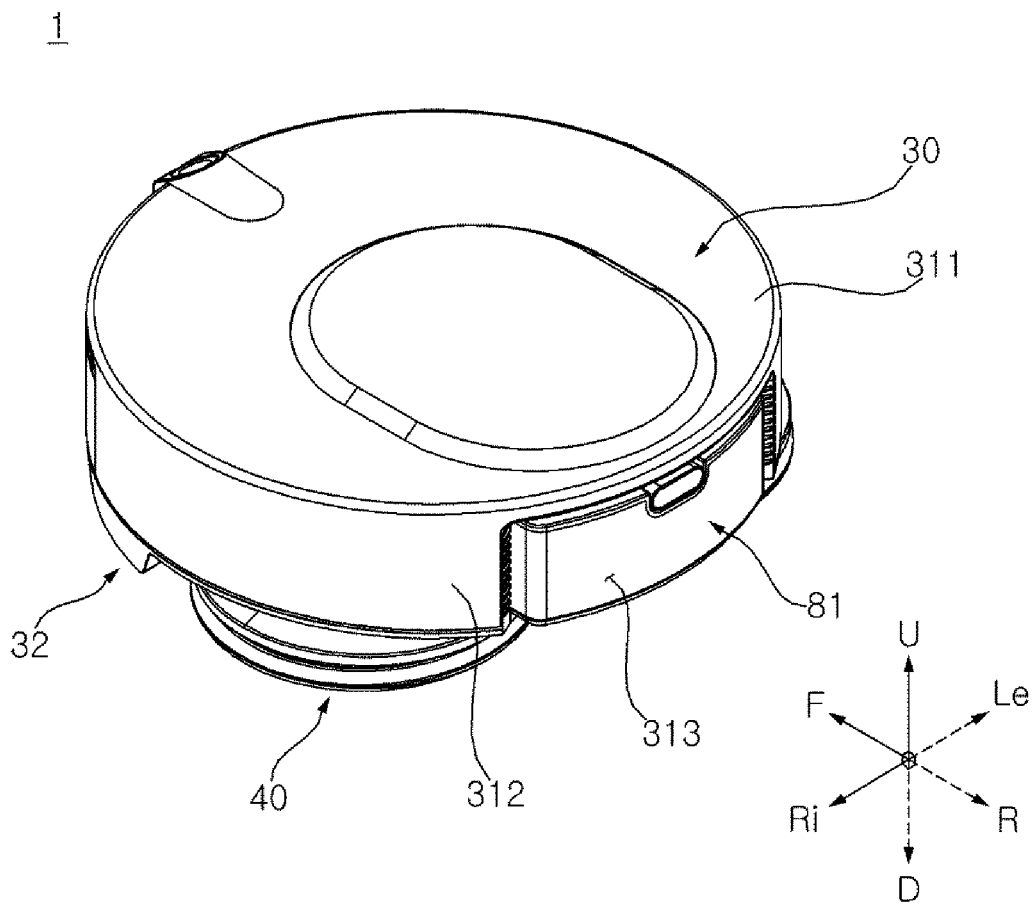
FIG. 1 is a perspective view of a mobile robot according to a first embodiment of the present invention.

In the following description, the terms "forward (F)," "rearward (R)," "leftward (Le)," "rightward (Ri)," "upward (U)," and "downward (D)," which indicate directions, are defined based on the illustrations in the drawings. However, these definitions are given only for clear understanding of the present invention, and the directions may be defined differently depending on the circumstances.

For example, a direction parallel to an imaginary line connecting the center axis of a left spin mop and the center axis of a right spin mop is defined as a leftward-rightward direction, a direction perpendicular to the leftward-rightward direction and parallel to the center axes of the spin mops within an angular range of 5 degrees or less is defined as an upward-downward direction, and a direction perpendicular to both the leftward-rightward direction and the upward-downward direction is defined as a forward-backward direction.

In the following description, the terms "first," "second," and "third" are used only to avoid confusing designated components, and do not indicate the sequence or importance of the components or the relationships between the components. For example, an embodiment including only a second component but lacking a first component is also feasible.

In the specification, the expression of singularity includes a plural meaning unless the singular expression is explicitly different in context.

A "mop", which will be mentioned below, may be made of various materials, such as fabric or paper. In addition, the mop may be washable for repeated use or disposable.

Figure 2:
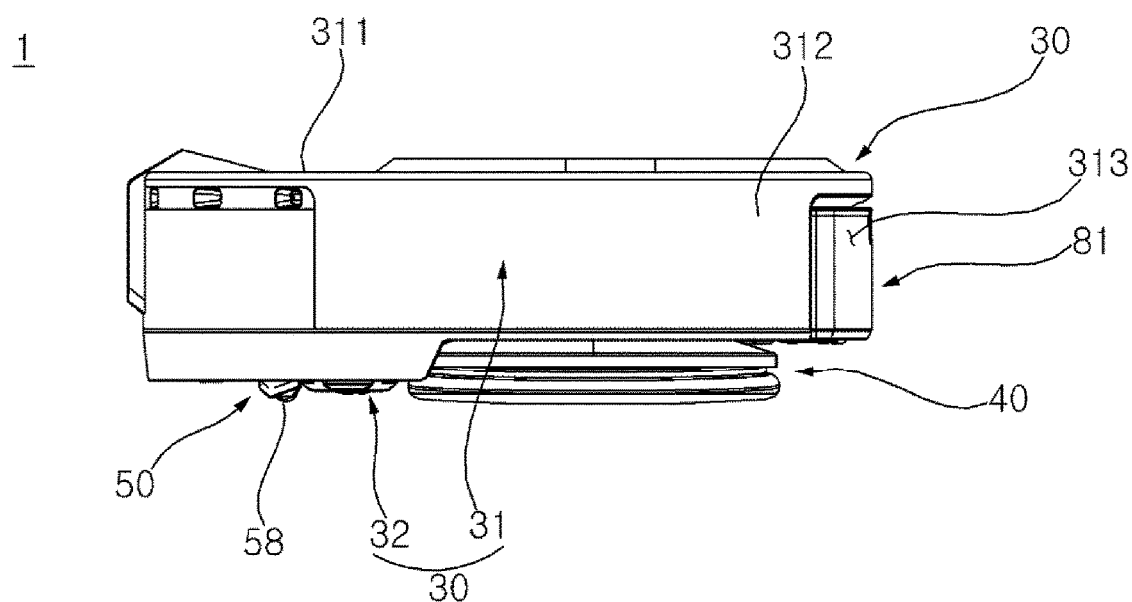
FIG. 2 is a left side view of FIG. 1.

Hereinafter, a cleaner 1 according to the embodiments of the present invention will be generally described with reference to FIGS. 1 to 3.

The cleaner 1 according to the embodiments of the present invention performs mopping. The cleaner 1 may be configured to travel autonomously. The cleaner 1 according to one embodiment of the present invention includes a body 30, which is provided with a controller.

The body 30 includes a case 31, which defines the external appearance thereof, and a base 32, which is disposed under the case 31. The outer surface of the body 30 forms at least a portion of a circle having a radius within a predetermined error range from a reference radius. Here, a circle having a radius within a predetermined error range from a reference radius is not a perfect circle, but is a circle having a radius that may vary within an error range for each central angle or for each section.

Specifically, when viewed in the vertical direction, 50% or more of the area of the body 30 may be formed in a circular shape, and the remaining area thereof may be formed in a shape close to a circle, considering engagement with other components. Of course, the circle mentioned herein is a circle having a tolerance in an engineering sense, rather than a mathematically perfect circle.

The mobile robot 1 includes a mop module 40, which is configured to perform mopping via contact with a floor (a surface to be cleaned).

The mop module 40 may be disposed under the body 30, and may support the body 30. In this embodiment, the body 30 is supported by the mop module 40. The body 30 defines the external appearance of the mobile robot.

The mop module 40 is disposed under the body 30. The mop module 40 provides driving force for moving the mobile robot 1. In order to move the mobile robot 1, the mop module 40 is preferably disposed at the rear side of the mobile robot 1.

The mop module 40 includes at least one mop unit (not shown) configured to perform mopping while rotating. The mop module 40 includes at least one spin mop 41. The spin mop 41 rotates in the clockwise direction or the counterclockwise direction when viewed from the upper side. The spin mop 41 comes into contact with the floor.

In this embodiment, the mop module 40 may include a pair of spin mops 41a and 41b. The spin mops 41a and 41b perform mopping on the floor while rotating in the clockwise direction or the counterclockwise direction when viewed from the upper side. When viewed from the front side in the travel direction of the cleaner, the spin mop 41 disposed on the left side, among the spin mops 41a and 41b, is defined as a left spin mop 41a, and the spin mop 41 disposed on the right side, among the spin mops 41a and 41b, is defined as a right spin mop 41b.

Each of the left spin mop 41a and the right spin mop 41b is rotated about the rotation shaft thereof. The rotation shaft is disposed in the upward-downward direction. The left spin mop 41a and the right spin mop 41b may be rotated independently of each other. The pair of spin mops 41 may be disposed to be bilaterally symmetrical to each other with respect to an imaginary central vertical plane Po.

The present invention includes a mop motor 61, which provides driving force to the left spin mop 41a and the right spin mop 41b and is mounted to the body 30. The mop motor 61 includes a first mop motor 61a and a second mop motor 61b. The rotation shaft of the mop motor may extend vertically. The first mop motor 61a and the second mop motor 61b are disposed to be bilaterally symmetrical to each other with respect to a central vertical line Po.

The central vertical line Po is a line that is parallel to the forward-backward direction and passes through the geometric center Tc of the body. Of course, the central vertical line Po may be defined as a line that passes through the geometric center Tc of the body while perpendicularly intersecting an imaginary line connecting the center axis of the left spin mop and the center axis of the right spin mop.

If the bottoms of the spin mops 41a and 41b, which are disposed to be bilaterally symmetrical to each other with respect to the central vertical line Po, are laid parallel to the horizontal surface, the robot cleaner is not capable of stably traveling, and travel control thereof becomes difficult. Therefore, in the present invention, each spin mop 41 is mounted so as to be inclined downwards in the forward direction. Hereinafter, the inclination and motion of the spin mop 41 will be described.

Referring again to FIG. 3, a point at which the spin rotation axisOsa of the left spin mop41a and the bottom surface of the left spin mop41a meet is illustrated, and a point at which the spin rotation axisOsb of the right spin mop41b and the bottom surface of the right spin mop41b meet is illustrated. When viewed from the lower side, the clockwise rotation direction of the left spin mop 41a is defined as a first forward direction w1f, and the counterclockwise rotation direction of the left spin mop 41a is defined as a first reverse direction w1r. When viewed from the lower side, the counterclockwise rotation direction of the right spin mop 41b is defined as a second forward direction w2f, and the clockwise rotation direction of the right spin mop 41b is defined as a second reverse direction w2r. In addition, when viewed from the lower side, an "acute angle that the inclined direction of the bottom surface of the left spin mop 41a makes with the transverse axis" and an "acute angle that the inclined direction of the bottom surface of the right spin mop 41b makes with the transverse axis" are defined as inclined-direction angles Ag1a and Ag1b. The inclined-direction angle Ag1a of the left spin mop 41a and the inclined-direction angle Ag1b of the right spin mop 41b may be the same as each other. In addition, referring to FIG. 3, an "angle that the bottom surface I of the left spin mop 41a makes with an imaginary horizontal plane H" and an "angle that the bottom surface I of the right spin mop 41b makes with the imaginary horizontal plane H" are defined as inclination angles Ag2a and Ag2b.

Of course, the right end of the left spin mop 41a and the left end of the right spin mop 41b may be in contact with each other, or may be adjacent to each other. Accordingly, it is possible to reduce a region that is not mopped between the left spin mop 41a and the right spin mop 41b.

When the left spin mop 41a rotates, the point P1a on the bottom surface of the left spin mop 41a that receives the largest frictional force from the floor is located on the left side of the rotation center Osa of the left spin mop 41a. The largest frictional force may be generated at the point P1a by transmitting a larger load from the point P1a to the floor than from any other point on the bottom surface of the left spin mop 41a. In this embodiment, the point P1a is located on the left-front side of the rotation center Osa. However, in another embodiment, the point P1a may be located exactly on the left side of the rotation center Osa, or may be located on the left-rear side of the rotation center Osa.

When the right spin mop 41b rotates, the point P1b on the bottom surface of the right spin mop 41b that receives the largest frictional force from the floor is located on the right side of the rotation center Osb of the right spin mop 41b. The largest frictional force may be generated at the point P1b by transmitting a larger load from the point P1b to the floor than from any other point on the bottom surface of the right spin mop 41b. In this embodiment, the point P1b is located on the right-front side of the rotation center Osb. However, in another embodiment, the point P1b may be located exactly on the right side of the rotation center Osb, or may be located on the right-rear side of the rotation center Osb.

The bottom surface of the left spin mop 41a and the bottom surface of the right spin mop 41b are respectively arranged at an incline. The inclination angle Ag2a of the left spin mop 41a and the inclination angle Ag2b of the right spin mop 41b are acute angles. The inclination angles Ag2a and Ag2b may be set to be small such that the points P1a and P1b receive the largest frictional force and such that the entire bottom area of the mop unit 411 contacts the floor via rotation of the left spin mop 41a and the right spin mop 41b.

Figure 6:
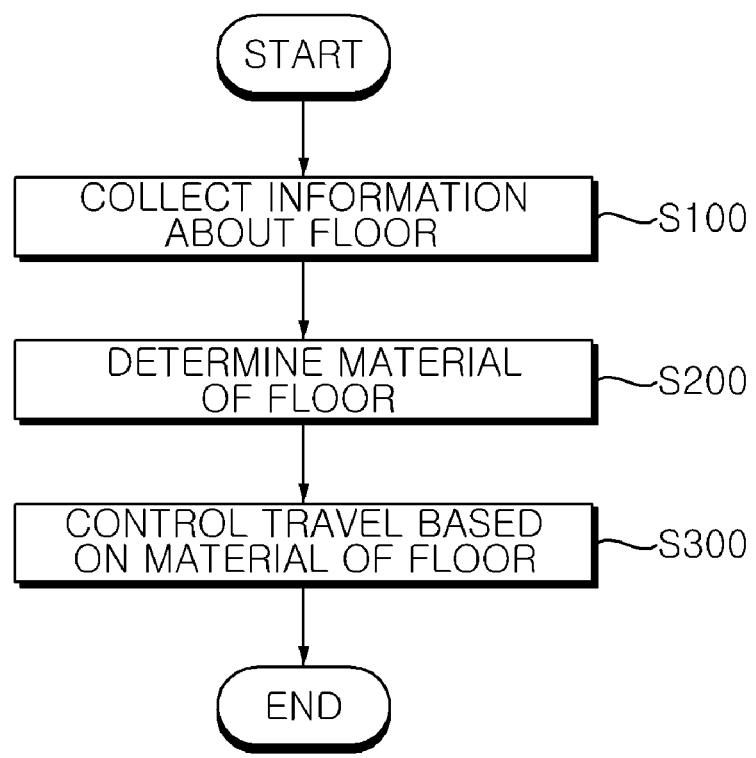
FIG. 6 is a flowchart showing a control method of the mobile robot according to a first embodiment of the present invention.

The bottom surface of the left spin mop 41a has an overall downward inclination formed in the leftward direction. The bottom surface of the right spin mop 41b has an overall downward inclination in the rightward direction. Referring to FIG. 6, the bottom surface of the left spin mop 41a has the lowest point P1a located at the left portion thereof. The bottom surface of the left spin mop 41a has the highest point Pha located at the right portion thereof. The bottom surface of the right spin mop 41b has the lowest point P1b located at the right portion thereof. The bottom surface of the right spin mop 41b has the highest point Phb located at the left portion thereof.

In some embodiments, the inclined-direction angles Ag1a and Ag1b may be set to 0 degrees. In addition, in some embodiments, when viewed from the lower side, the inclined direction of the bottom surface of the left spin mop 41a may form an inclined-direction angle Ag1a in the clockwise direction with respect to the transverse axis, and the inclined direction of the bottom surface of the right spin mop 41b may form an inclined-direction angle Ag1b in the counterclockwise direction with respect to the transverse axis. In this embodiment, when viewed from the lower side, the inclined direction of the bottom surface of the left spin mop 41a forms an inclined-direction angle Ag1a in the counterclockwise direction with respect to the transverse axis, and the inclined direction of the bottom surface of the right spin mop 41b forms an inclined-direction angle Ag1b in the clockwise direction with respect to the transverse axis.

The mobile robot 1 may be moved by a frictional force with the floor that is generated by the mop module 40.

The mop module40 may generate forward-movement frictional force for moving the body 30 forwards or backward-movement frictional force for moving the body 30 backwards. The mop module 40 may generate leftward-moment frictional force for turning the body 30 to the left or rightward-moment frictional force for turning the body 30 to the right. The mop module 40 may generate frictional force by combining any one of the forward-movement frictional force and the backward-movement frictional force and any one of the leftward-moment frictional force and the rightward-moment frictional force.

In order to generate the forward-movement frictional force, the mop module 40 may rotate the left spin mop 41a at a predetermined number of revolutions per minute (rpm) R1 in the first forward direction w1f, and may rotate the right spin mop 41b at the predetermined rpm R1 in the second forward direction w2f.

In order to generate the backward-movement frictional force, the mop module 40 may rotate the left spin mop 41a at a predetermined rpm R2 in the first reverse direction w1r, and may rotate the right spin mop 41b at the predetermined rpm R2 in the second reverse direction w2r.

In order to generate the rightward-moment frictional force, the mop module40 may rotate the left spin mop41a in the first forward direction w1f at a predetermined rpm R3, and i) may rotate the right spin mop41b in the second reverse direction w2r, ii) may halt the right spin mop41b without rotation, or iii) may rotate the right spin mop41b in the second forward direction w2f at an rpm R4, which is lower than the rpm R3.

In order to generate the leftward-moment frictional force, the mop module40 may rotate the right spin mop41b in the second forward direction w2f at a predetermined rpm R5, and i) may rotate the left spin mop41a in the first reverse direction w1r, ii) may halt the left spin mop41a without rotation, or iii) may rotate the left spin mop 41a in the first forward direction w1f at an rpm R6, which is lower than the rpm R5.

Hereinafter, the arrangement of each component for increasing the frictional force of the spin mops 41 disposed to the left and right, improving stability in the leftward-rightward direction and the forward-backward direction, and stabilizing travel irrespective of the water level in a water tank 81 will be described.

Figure 3:
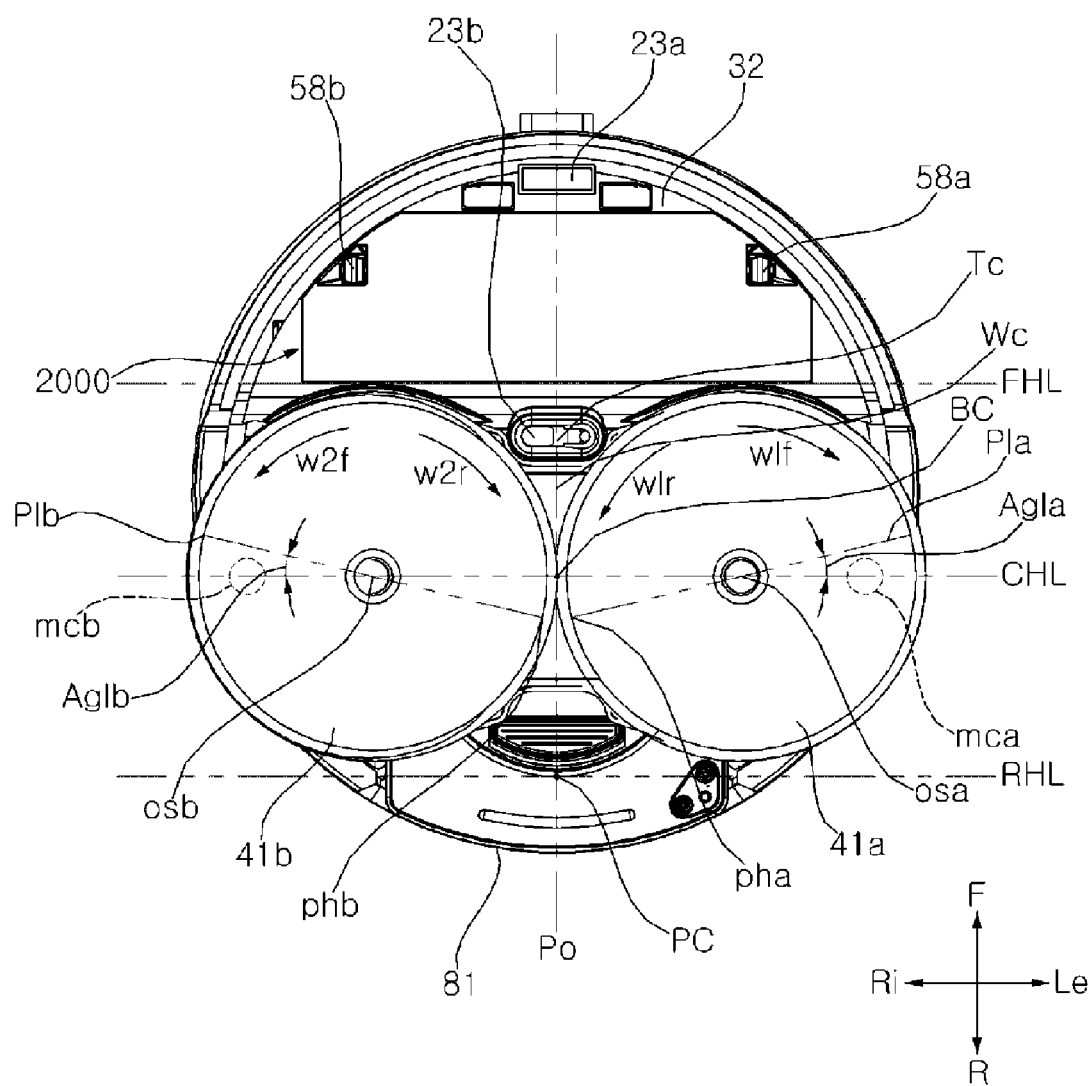
FIG. 3 is a bottom view of FIG. 1.

Referring to FIG. 3, in order to increase the frictional force of the spin mops 41 and to prevent the occurrence of eccentricity in one direction during rotation of the mobile robot, mop motors 61 and a battery, which are relatively heavy, may be disposed on the spin mops 41.

Specifically, the first mop motor 61a may be disposed on the left spin mop 41a, and the second mop motor 61b may be disposed on the right spin mop 41b. That is, at least a portion of the first mop motor 61a may vertically overlap the left spin mop 41a. Preferably, the entirety of the first mop motor 61a may vertically overlap the left spin mop 41a. At least a portion of the second mop motor 61b may vertically overlap the right spin mop 41b. Preferably, the entirety of the second mop motor 61b may vertically overlap the right spin mop 41b.

More specifically, the first mop motor 61a and the second mop motor 61b may be disposed so as to vertically overlap the imaginary central horizontal line CHL connecting the spin rotation axis Osa of the left spin mop 41a and the spin rotation axis Osb of the right spin mop 41b. Preferably, the center of gravity MCa of the first mop motor 61a and the center of gravity MCb of the second mop motor 61b may be disposed so as to vertically overlap the imaginary central horizontal line CHL connecting the spin rotation axis Osa of the left spin mop 41a and the spin rotation axis Osb of the right spin mop 41b. Alternatively, the geometric center of the first mop motor 61a and the geometric center of the second mop motor 61b may be disposed so as to vertically overlap the imaginary central horizontal line CHL connecting the spin rotation axis Osa of the left spin mop 41a and the spin rotation axis Osb of the right spin mop 41b. Of course, the first mop motor 61a and the second mop motor 61b are disposed to be symmetrical to each other with respect to the central vertical line Po.

Since the center of gravity MCa of the first mop motor 61a and the center of gravity MCb of the second mop motor 61b are disposed to be bilaterally symmetrical to each other without deviating from the positions above the respective spin mops 41, it is possible to increase the frictional force of the spin mops 41 and to maintain traveling performance and left and right balance.

Hereinafter, the spin rotation axis Osa of the left spin mop 41a is referred to as a left spin rotation axis Osa, and the spin rotation axis Osb of the right spin mop 41b is referred to as a right spin rotation axis Osb.

Since the water tank 81 is disposed further backwards than the central horizontal line CHL and the amount of water in the water tank 81 is variable, in order to maintain stable front and rear balance irrespective of the water level in the water tank 81, the first mop motor 61a may be disposed to be biased to the left side from the left spin rotation axis Osa. The first mop motor 61a may be disposed to be biased to the left-front side from the left spin rotation axis Osa. Preferably, the geometric center of the first mop motor 61a or the center of gravity MCa of the first mop motor 61a may be disposed to be biased to the left side from the left spin rotation axis Osa. Alternatively, the geometric center of the first mop motor 61a or the center of gravity MCa of the first mop motor 61a may be disposed to be biased to the left-front side from the left spin rotation axis Osa.

The second mop motor 61b may be disposed to be biased to the right side from the right spin rotation axis Osb. The second mop motor 61b may be disposed to be biased to the right-front side from the right spin rotation axis Osb. Preferably, the geometric center of the second mop motor 61b or the center of gravity MCb of the second mop motor 61b may be disposed to be biased to the right side from the right spin rotation axis Osb. Alternatively, the geometric center of the second mop motor 61b or the center of gravity MCb of the second mop motor 61b may be disposed to be biased to the right-front side from the right spin rotation axis Osb.

Since the first mop motor 61a and the second mop motor 61b apply pressure at positions biased to the front-outer side from the centers of the respective spin mops 41, the pressure concentrates on the front-outer portions of the respective spin mops 41, so traveling performance is improved by the rotational force of the spin mops 41.

The left spin rotation axis Osa and the right spin rotation axis Osb are disposed further backwards than the center of the body 30. The central horizontal line CHL is disposed further backwards than the geometric center Tc of the body 30 and the center of gravity WC of the mobile robot. The left spin rotation axis Osa and the right spin rotation axis Osb are spaced the same distance apart from the central vertical line Po.

In this embodiment, a single battery is provided. At least a portion of the battery is disposed on the left spin mop 41a and the right spin mop 41b. Since the battery, which is relatively heavy, is disposed on the spin mops 41, it is possible to increase the frictional force of the spin mops 41 and to reduce the occurrence of eccentricity during rotation of the mobile robot.

Specifically, a left portion of the battery may be disposed so as to vertically overlap the left spin mop 41a, and a right portion of the battery may be disposed so as to vertically overlap the right spin mop 41b. The battery may be disposed so as to vertically overlap the central horizontal line CHL and to vertically overlap the central vertical line Po.

More specifically, the center of gravity BC of the battery or the geometric center of the battery may be disposed on the central vertical line Po, and may be disposed on the central horizontal line CHL. Of course, the center of gravity BC of the battery or the geometric center of the battery may be disposed on the central vertical line Po, may be disposed further forwards than the central horizontal line CHL, and may be disposed further backwards than the geometric center Tc of the body 30.

The center of gravity BC of the battery or the geometric center of the battery may be disposed further forwards than the water tank 81 or the center of gravity PC of the water tank 81.

Since one battery is disposed in the middle between the left spin mop 41a and the right spin mop 41b and is disposed on the central horizontal line and the central vertical line Po, the heavy battery serves to maintain the balance of the spin mops 41 during rotation of the spin mops 41 and to apply weight to the spin mops 41, thereby increasing the frictional force of the spin mops 41.

The battery may be disposed at the same height (height to the lower end thereof) or in the same plane as the first mop motor 61a and the second mop motor 61b. The battery may be disposed between the first mop motor 61a and the second mop motor 61b. The battery is disposed in an empty space between the first mop motor 61a and the second mop motor 61b.

At least a portion of the water tank 81 is disposed on the left spin mop 41*a* and the right spin mop 41*b*. The water tank 81 may be disposed further backwards than the central horizontal line, and may be disposed so as to vertically overlap the central vertical line Po.

More specifically, the center of gravity PC of the water tank 81 or the geometric center of the water tank 81 may be disposed on the central vertical line Po, and may be located further forwards than the central horizontal line. Of course, the center of gravity PC of the water tank 81 or the geometric center of the water tank 81 may be disposed on the central vertical line Po, and may be disposed further backwards than the central horizontal line. Here, the configuration in which the center of gravity PC of the water tank 81 or the geometric center of the water tank 81 is disposed further backwards than the central horizontal line means that the center of gravity PC of the water tank 81 or the geometric center of the water tank 81 is disposed so as to vertically overlap an area located further backwards than the central horizontal line. Of course, the center of gravity PC of the water tank 81 or the geometric center of the water tank 81 is located so as to vertically overlap the body 30 without deviating from the body 30.

The center of gravity PC of the water tank 81 or the geometric center of the water tank 81 may be disposed further backwards than the center of gravity BC of the battery.

The water tank 81 may be disposed at the same height (height to the lower end thereof) or in the same plane as the first mop motor 61*a* and the second mop motor 61*b*. The water tank 81 may be disposed at the rear side in the space between the first mop motor 61*a* and the second mop motor 61*b*.

A portion of each spin mop 41 vertically overlaps the body 30, and another portion of each spin mop 41 is exposed to the outside of the body 30. The proportion of the area of each spin mop 41, which vertically overlaps the body 30, is preferably 85% to 95% of the entire area of each spin mop 41.

Specifically, the angle between a line connecting the right end of the body and the right end of the right spin mop 41*b* and a vertical line extending from the right end of the body so as to be parallel to the central vertical line Po may be 0 degrees to 5 degrees.

The length of the area of each spin mop 41, which is exposed to the outside of the body, is preferably ½ to ⅐ of the radius of each spin mop 41. The length of the area of each spin mop 41, which is exposed to the outside of the body, may be the distance from one end of each spin mop 41, which is exposed to the outside of the body, to the rotation axis of each spin mop 41.

The distance between the end of the area of each spin mop 41, which is exposed to the outside of the body, and the geometric center Tc of the body may be greater than the average radius of the body.

The position at which each spin mop 41 is exposed is located between the lateral portion of the body 30 and the rear portion thereof. That is, assuming that the body is sectioned into four quadrants arranged sequentially in the clockwise direction when viewed from the lower side, the position at which each spin mop 41 is exposed may be located in the second quadrant or the third quadrant of the body 30.

Figure 4:
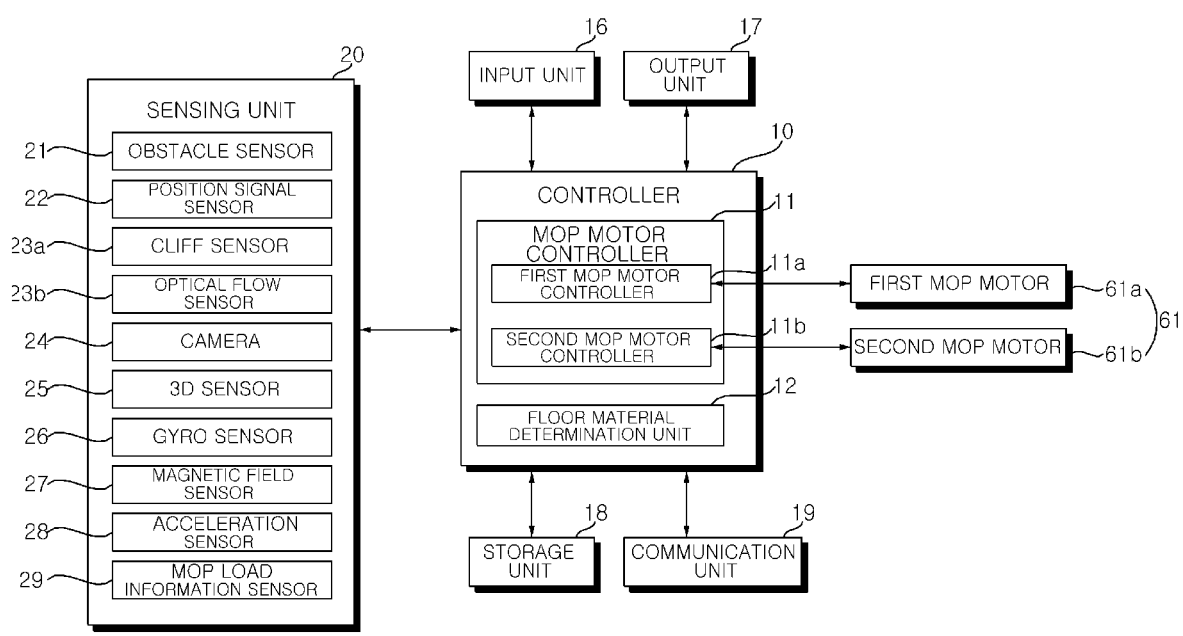
FIG. 4 is a control block diagram of a mobile robot according to one embodiment of the present invention.

Referring to FIG. 4, the mobile robot 1 includes a sensing unit 20 for sensing various pieces of information related to the operation or state of the mobile robot 1 or the external situation.

The sensing unit 20 may include an obstacle sensor 21 for sensing external obstacles present apart from the mobile robot 1. A plurality of obstacle sensors may be provided. The obstacle sensor 21 includes an obstacle sensor for sensing obstacles present in the forward region. The obstacle sensor 21 includes an obstacle sensor for sensing obstacles present in the leftward and rightward regions. The obstacle sensor 21 may be disposed at the body 30. The obstacle sensor 21 may include an infrared sensor, an ultrasonic sensor, an RF sensor, a geomagnetic sensor, and a position-sensitive device (PSD) sensor.

The sensing unit 20 may include a position signal sensor 22 for receiving an external identification signal to determine the location of the mobile robot. For example, the position signal sensor 22 may be an ultra-wide band (UWB) sensor using a UWB signal. The controller 10 may determine the location of the mobile robot 1 based on the signal received from the position signal sensor 22.

The external identification signal is a signal that is transmitted by an external signal generator, such as a beacon. A plurality of signal generators may be provided so as to be spaced apart from each other. The position signal sensor 22 may receive identification signals from signal generators disposed at different places.

The sensing unit 20 may include a cliff sensor 23*a* for detecting the presence or absence of a cliff on the floor or detecting the distance to the floor. The cliff sensor 23*a* may detect whether a cliff is present in front of and/or behind the mobile robot 1. The cliff sensor 23*a* may detect the distance to the floor. When the distance to the floor is greater than a predetermined distance, the controller 10 may determine that a cliff is present, and may perform control such that the operation corresponding thereto is performed.

For example, the cliff sensor 23*a* may include an optical sensor, and the optical sensor may include a laser sensor or an infrared sensor. The cliff sensor 23*a* may include a light-emitting unit (not shown), which emits light toward the floor, and a light-receiving unit (not shown), which receives light reflected from the floor. The cliff sensor 23*a* may measure the distance using the time taken for the light to return to the light-receiving unit.

In addition, the cliff sensor 23*a* may detect the quantity of light reflected from the floor. Specifically, the light-receiving unit may calculate the reflectance of the light emitted from the light-emitting unit by measuring the illuminance and the quantity of light returning to the light-receiving unit. The cliff sensor 23*a* detects the quantity of light reflected from the floor, and provides a means for detecting the material of the floor to the controller 10.

The cliff sensor 23*a* may be disposed further forwards than the pair of spin mops 41. When the cliff sensor 23*a* is disposed further forwards than the pair of spin mops 41, there is an advantage in that it is possible to avoid a carpet proactively before a larger amount of load is applied to the pair of spin mops 41 by the carpet. In addition, the cliff sensor 23*a* may be disposed further forwards than the front ends of the pair of spin mops 41 and/or the optical flow sensor 23*b*.

The sensing unit 20 may include an optical flow sensor 23*b* for detecting the amount of movement of the mobile robot based on the image of the floor. The optical flow sensor 23*b* may detect the quantity of light reflected from the floor. Alternatively, the optical flow sensor 23*b* may acquire bottom-view image information using light at a regular time interval, and may provide the bottom-view image information to the floor material determination unit 12 or the controller 10.

The optical flow sensor 23b converts the bottom-view image received from an image sensor provided in the sensor to generate image data in a predetermined format. The generated image data may be transmitted to the controller 10.

In addition, the optical flow sensor (OFS) 23b includes an image sensor (not shown) for capturing a bottom-view image to acquire bottom-view image information and one or more light sources (not shown) for emitting planar light toward the floor.

One or more light sources radiate light onto a predetermined area of the floor, which is photographed by the image sensor. That is, when the mobile robot moves a specific area along the floor, if the floor is flat, the distance between the image sensor and the floor is maintained constant.

On the other hand, when the mobile robot moves an uneven surface of the floor, the distance to the floor increases above a predetermined distance due to irregularities of the floor or an obstacle CA. At this time, one or more light sources may be controlled by the controller 10 so as to adjust the quantity of light emitted therefrom. The light source may be a light-emitting device capable of adjusting the quantity of light, for example, a light-emitting diode (LED).

Using the optical flow sensor 23b, the controller 10 may detect the location of the mobile robot regardless of sliding of the mobile robot. The controller 10 may compare and analyze image data captured by the optical flow sensor 23b over time to calculate the moving distance and the moving direction of the mobile robot, and may calculate the location of the mobile robot based thereon. Based on the bottom-view image information of the mobile robot using the optical flow sensor 23b, the controller 10 may perform compensation resistant to sliding with respect to the location of the mobile robot calculated by other means.

The optical flow sensor 23b detects the quantity of light reflected from the floor or analyzes the image of the floor, and provides a means for detecting the material of the floor to the controller 10.

The optical flow sensor 23b may be disposed so as to at least partially overlap the central vertical plane in the vertical direction. Specifically, the optical flow sensor 23b is located further forwards than a line connecting the center axes of the pair of spin mops 41 on the central vertical plane. As another example, the optical flow sensor 23b may be located further forwards than the pair of spin mops 41.

When the optical flow sensor 23b is disposed further forwards than the mop module, there is an advantage in that it is possible to avoid a carpet proactively before a larger amount of load is applied to the mop module by the carpet.

Therefore, although the optical flow sensor 23b is singular in number, rather than plural in number, since it is disposed at a position further forward than the center of the body, it is possible to detect the material of the floor ahead of the pair of spin mops.

In addition, the cliff sensor 23a and the optical flow sensor 23b are capable of not only detecting a cliff and the amount of movement of the mobile robot but also simultaneously determining the material of the floor.

The sensing unit 20 may include a camera 24 for sensing an image of the outside. The camera 24 may be disposed at the body 30. The camera 24 may acquire top-view image information at a regular time interval.

The sensing unit 20 may include a three-dimensional (3D) sensor 25 for sensing 3D location information of an external environment. The 3D sensor 25 acquires top-view image information at a regular time interval.

As one example, the 3D sensor 25 may include a light-emitting unit (not shown) for emitting an infrared ray and a 3D depth camera (not shown) for sensing the infrared ray reflected from an external object. The light-emitting unit may emit an infrared ray having a predetermined pattern. The 3D camera may be an IR camera, a RGB-Depth camera, or the like. The 3D sensor 25 may be implemented in a time of flight (TOF) scheme.

As another example, the 3D sensor 25 may include two or more cameras, and may be implemented in a stereo vision scheme in which 3D coordinate information is generated by combining two or more images acquired by the two or more cameras.

The sensing unit 20 may include a tilt information acquisition unit (not shown) for acquiring information on tilt of the body 30 relative to the floor H. For example, the tilt information acquisition unit may include a gyro sensor 26. The tilt information acquisition unit may include a processing module (not shown) that converts a sensing signal of the gyro sensor 26 into the tilt information. The processing module may be implemented to be an algorithm or a program as part of the controller 10. As another example, the tilt information acquisition unit may include a magnetic field sensor 27 to acquire the tilt information based on sensing information about the magnetic field of the earth.

Herein, the floor His the horizontal plane, which is a plane perpendicular to the gravity direction. The gyro sensor 26 may acquire information about a rotational angular speed of the body 30 relative to the horizontal plane. Specifically, the gyro sensor 26 may sense a rotational angular speed about the X-axis and the Y-axis, which are parallel to the horizontal plane and perpendicular to each other. A rotational angular speed relative to the horizontal plane may be calculated by combining a rotational angular speed (roll) about the X-axis and a rotational angular speed (pitch) about the Y-axis using the processing module. A tilt value may be calculated by integrating the rotational angular speeds using the processing module.

The gyro sensor 26 may sense a predetermined reference direction. The tilt information acquisition unit may acquire tilt information based on the reference direction.

The gyro sensor 26 may have a gyro sensing function with respect to three axes perpendicular to one another in a space coordinate system. Information collected by the gyro sensor 26 may be roll, pitch, and yaw information. The processing module is capable of calculating a heading angle of the mobile robot 1 by integrating rolling, pitching, and yaw angular speeds.

It is preferable for the gyro sensor 26 to be disposed at the body 30. Accordingly, the gyro sensor 26 is disposed at a remaining part Q of the body 30, which will be described later. In addition, the tilt information acquisition unit is disposed at the remaining part Q.

The gyro sensor 26 may be implemented as a separate sensor, or may be implemented as some functions of an IMU sensor, which will be described later.

The sensing unit 20 may include a magnetic field sensor 27 that senses a magnetic field. The magnetic field sensor 27 may have a function of sensing a magnetic field with respect to three axes perpendicular to one another in a space coordinate system. The magnetic field sensor 27 may measure a heading angle (an azimuth angle). The magnetic field sensor 27 may be implemented as a separate sensor, or may be implemented as some functions of an IMU sensor, which will be described later.

The sensing unit 20 may include an acceleration sensor 28 that is mounted to the body 30 to sense acceleration of the mobile robot 1. The acceleration sensor 28 may have a function of sensing acceleration with respect to three axes perpendicular to one another in a space coordinate system. The acceleration sensor 28 may be implemented as a separate sensor, or may be implemented as some functions of an IMU sensor, which will be described later.

The mobile robot 1 may include an inertial sensor unit (IMU) (not shown). Based on information of the IMU, the mobile robot 1 may stabilize a traveling motion. The IMU may have a function of the gyro sensor 26, a function of the magnetic field sensor 27, and a function of the acceleration sensor 28.

The sensing unit 20 may include a mop load information sensor 29 that acquires load information of the mop motor 61.

As one example, the mop load information sensor 29 may sense the load of the mop motor 61 by sensing a motor load current value or a motor load voltage value of the mop motor 61. Specifically, the mop load information sensor 29 may be implemented by a current detection unit provided in a mop motor controller 11.

As another example, the mop load information sensor 29 may be provided using an encoder that senses a rotation speed or the number of rotation of the spin mop. Specifically, as the load applied to the mop 411 is increased, the rotation speed may be reduced compared to a rotation signal (a current value, a voltage value, or the like) applied to the mop motor 61. The load information may be acquired as information about the rotation speed is sensed by the encoder.

The sensing unit 20 may include a collision sensor (not shown) that senses contact with an external obstacle. The collision sensor may be implemented by a bumper (not shown) that is pressed by an external object.

The sensing unit 20 may include an encoder (not shown) that recognizes a path along which the mobile robot 1 actually moves. The function of the encoder may be performed by an auxiliary wheel 58.

The mobile robot 1 includes an input unit 16 through which various commands from a user can be input. The input unit 16 may include a button, a dial, a touch-type display, etc. The input unit 16 may include a microphone (not shown) for voice recognition. The input unit 16 may include a power switch 16*a* for inputting On/Off of power supply.

The mobile robot 1 includes an output unit 17 that outputs various kinds of information to a user. The output unit 17 may include a display (not shown) that outputs visual information. The output unit 17 may include a speaker (not shown) that outputs audible information.

The mobile robot 1 includes a storage unit 18 that stores various kinds of information. The storage unit 18 may include a volatile or non-volatile recording medium. The storage unit 18 may store an algorithm for controlling operation to respond to a variety of errors of the mobile robot 1.

A map about a traveling region may be stored in the storage unit 18. The map may be input by an external terminal capable of exchanging information through a communication unit 19, or may be generated as the mobile robot 1 learns the same by itself. In the former case, the external terminal may be, for example, a remote controller, a PDA, a laptop, a smartphone, and a tablet in which an application for setting a map is installed.

The mobile robot 1 may include the communication unit 19 capable of accessing a specific network. According to a communication standard, the communication unit 19 may be implemented using a wireless communication technology, such as IEEE 802.11 WLAN, IEEE 802.15 WPAN, Ultra-Wide Band (UWB), Wi-Fi, ZigBee, Z-wave, Bluetooth, etc.

The mobile robot 1 includes a controller 10 that controls autonomous traveling. The controller 10 may be implemented by a PCB Co disposed inside the body 30.

The controller 10 may process a signal from the input unit 16 or a signal input through the communication unit 19.

The controller 10 may control traveling of the cleaner by receiving a sensing signal of the sensing unit 20. The controller 10 may control the mop motor 61 by receiving a sensing signal of the sensing unit 20.

The controller 10 may control a water supply module (not shown). The controller 10 may control a pump (not shown) to adjust the amount of water to be supplied. Due to control of the pump (not shown), the amount of water to be supplied to the mop module 40 per hour may be changed. As another example, the controller 10 may control a value, which will be described later, to change whether or not to supply water.

The controller 10 may learn a travel region through an image (top-view image information) obtained by the camera 24 or the 3D sensor, and may control the current location to be recognizable (detectable). The controller 10 may be provided to map the travel region through the image. The controller 10 may be provided to allow the current location to be recognizable on a mapped map through the image. An image captured by the camera 24 may be used to generate a map of the travel region and to detect the current location within the travel region.

For example, the controller 10 may generate a map of the travel region using the boundary between a ceiling and a sidewall in a top-view image captured by the camera 24. In addition, the controller 10 may detect the current location within the travel region based on features in the image.

The controller 10 may control the mobile robot 1 to return back to a charging station after completion of traveling. As one example, the mobile robot 1 may be provided to return back to a charging station by sensing an infrared (IR) signal transmitted from the charging station. The controller 10 may control the mobile robot 1 to return back to the charging station based on a sensed signal, which is transmitted from the charging station. The charging station may include a signal transmitter (not shown) that transmits a predetermined return signal.

As another example, the controller 10 may control the mobile robot 1 to return back to the charging station by recognizing the current location on a map. By recognizing allocation corresponding to the charging station and the current location on the map, the mobile robot 1 is capable of returning back to the charging station.

The controller 10 may control the mobile robot 1 based on information input through a user's terminal (e.g. a smartphone, a computer, etc.). The mobile robot 1 may receive the input information through the communication unit 19. Based on the input information, the controller 10 may control the traveling pattern of the mobile robot 1 (e.g. traveling in a zigzag fashion or traveling a specific region to intensively clean the same). Based on the input information, the controller 10 may control whether or not to activate a specific function of the mobile robot 1 (e.g. a function of searching for a missing article or a function of repelling insects). Based on the input information, the controller 10 may set a cleaning travel start time of the mobile robot 1 to a specific time (a cleaning reservation function).

The controller 10 includes a mop motor controller 11 that controls driving of the mop motor 61. The mop motor controller 11 may include a first mop motor controller 11*a* that controls driving of the first mop motor 61*a*. The mop motor controller 11 may include a second mop motor controller 11b that controls driving of the second mop motor 61b.

In the case of a mobile robot that travels using frictional force between the spin mop and the floor, if the mobile robot moves onto a carpet, the spin mop catches on the carpet. In order to solve this, the present invention determines proactively whether the material of the floor is a troublesome material using various sensors.

The controller 10 may determine whether the material of the floor is a troublesome material based on information received from at least one of the optical flow sensor 23b, the acceleration sensor 28, the cliff sensor 23a, or the mop load information sensor 29, and, upon determining that the material of the floor is a troublesome material, may control the mop motor to perform an entry restriction operation.

The controller 10 may independently or comprehensively consider information received from the optical flow sensor 23b, the acceleration sensor 28, the cliff sensor 23a, and the mop load information sensor 29 in the determination as to whether the material of the floor is a troublesome material.

The controller 10 may further include a floor material determination unit 12, which determines the material of the floor.

The controller 10 may determine the material of the floor based on bottom-view image information obtained by the optical flow sensor 23b, and, upon determining that the material of the floor is a troublesome material, may control the mop motor 61 such that the mobile robot 1 performs an entry restriction operation. In addition, upon determining that the material of the floor is a troublesome material, the controller 10 may set the current location (or the current location and the surrounding region) as a troublesome region.

Hereinafter, the case in which the material of the floor is a troublesome material may be defined as the case in which an entry restriction condition is satisfied.

For example, the entry restriction operation may be an operation of controlling the mop motor 61 such that the mobile robot travels while avoiding a region satisfying the entry restriction condition. Here, avoiding a region satisfying the entry restriction condition means that the controller 10 controls the mop motor 61 such that the mobile robot travels on or cleans a region to be cleaned, except for a region satisfying the entry restriction condition (a region within a predetermined radius from the current location detected by the camera).

As another example, the entry restriction operation may include an avoidance travel operation for avoiding a region satisfying the entry restriction condition and an avoidance error response operation, which is performed when the avoidance travel operation is not performed properly. The avoidance error response operation may include an operation of outputting visual information such as a message, a picture, or a symbol. The avoidance error response operation may include an operation of outputting a predetermined sound. The avoidance error response operation may include an operation of stopping travel until the error is resolved. One avoidance error response operation may be constituted by combining one or more operations mentioned above.

As still another example, when the entry restriction condition is satisfied, the entry restriction operation may be performed so as to preferentially reduce the travel speed of the mobile robot in order to realize avoidance travel.

When the entry restriction condition is not satisfied (when the material of the floor is not a troublesome material), the controller 10 may activate a normal travel mode. The normal travel mode is a mode in which the mobile robot performs a predetermined normal operation, rather than the entry restriction operation.

Specifically, the floor material determination unit 12 may calculate, based on bottom-view image information, a floor reflectance value, an image quality value of the bottom-view image, and a frame rate of the bottom-view image, and may determine that the material of the floor is a troublesome material when at least one of Conditions 1 to 3 below is satisfied.

The image quality value is smaller than a predetermined reference image quality value     <Condition 1>

The frame rate is lower than a predetermined reference frame rate     <Condition 2>

The floor reflectance value is smaller than a predetermined reference reflectance value     <Condition 3>

As another example, the floor material determination unit 12 may calculate the image quality value of the bottom-view image based on the bottom-view image information, and when the image quality value is smaller than a predetermined reference image quality value, may determine that the material of the floor is a troublesome material.

As still another example, the floor material determination unit 12 may calculate the frame rate of the bottom-view image based on the bottom-view image information, and when the frame rate is lower than a predetermined reference frame rate, may determine that the material of the floor is a troublesome material.

As still another example, the floor material determination unit 12 may calculate the floor reflectance value based on the bottom-view image information, and when the floor reflectance value is smaller than a predetermined reference reflectance value, may determine that the material of the floor is a troublesome material.

Here, the image quality value is defined as a value obtained by digitizing the state of the bottom-view image captured by the optical flow sensor 23b.

The image quality value may be determined based on the shape of an image formed on the floor by light emitted from a light source. That is, when planar light having a predetermined shape is emitted from a light source onto the floor and a bottom-view image is obtained by capturing the light, the degree of similarity between the shape of the planar light emitted from the light source and the bottom-view image may be defined as the image quality value.

As another example, the image quality measurement process may be a process of measuring whether a contrast ratio is suitable after a smoothing process using a histogram. The image quality measurement process may include a binarization process and a process of determining suitability of a contrast ratio.

The smoothing process may be a process for improving a bottom-view image recognition rate using a histogram analysis. The obtained bottom-view image may be composed of a plurality of pixels. The histogram shows the distribution of intensity values for a plurality of pixels included in the bottom-view image. That is, the histogram shows the distribution of bright areas and dark areas in the bottom-view image. Specifically, the range of intensity values in a 256-gray-level image is 0 to 255. The histogram is a bar graph showing the frequency of intensity values for respective pixels. The smoothing process is a process of smoothing the distribution of intensity values when the distribution of the intensity values in the histogram is skewed or uneven. In other words, the smoothing process is a process of spreading intensity values that are skewed to one side in order to obtain an even distribution. Due to the smoothing process, a dark area of the bottom-view image is brightened, and a bright area thereof is darkened, so each pixel may have an appropriate intensity value.

The binarization process may be a process of classifying pixels constituting the bottom-view image into black pixels and white pixels after the smoothing process. Since the bottom-view image may have complicated shades after the smoothing process, the pixels may be binarized into black and white pixels through the binarization process. The binarization process requires a threshold value, based on which the pixels are classified as either black or white pixels. The threshold value may be a value set to classify the pixels into black and white pixels. When the intensity value of the pixel is greater than the threshold value, it may be classified as 0 (black), and when the intensity value of the pixel is less than the threshold value, it may be classified as 1 (white).

The process of determining a suitable contrast ratio may be a process of determining whether the contrast ratio of the binarized pixels satisfies a predetermined level.

When the proportion of blackness in the contrast ratio is relatively high, the image quality value is small. When the image quality value is small, it may be determined that the floor has high roughness or that the floor is a carpet. Accordingly, in the present invention, when the image quality value is smaller than a reference image quality value, the material of the floor is determined to be a troublesome material.

In addition, the reflectance of the floor may be a value obtained by dividing the number of white pixels by the number of black pixels. As another example, the reflectance of the floor may be defined as a quantity of light incident on the light-receiving unit (not shown) after being reflected from the floor, among the light emitted from the light source.

In the case in which the floor is made of a material having high reflectance and is flat, for example, when the floor is made of wood, marble, or linoleum, the image quality value of the bottom-view image, the reflectance of the floor, and the frame rate are high. However, in the case in which the floor is made of a material that has low reflectance and is rough, the image quality value of the bottom-view image, the reflectance of the floor, and the frame rate are low.

Accordingly, in the present invention, the material of the floor is determined based on the difference between multiple parameters of the bottom-view image obtained by the optical flow sensor 23b depending on the material of the floor, so the mobile robot is capable of avoiding a troublesome region rather than entering the same. In particular, it is possible to perform cross-verification and independent verification on multiple parameters using a single sensor, thus enabling accurate determination of the material of the floor.

Accordingly, the mobile robot may determine a region of the floor having low reflectance to be a carpet region, and may travel while avoiding the same. As a result, it is possible to solve the problem in which a mobile robot, which travels using the rotational force of a mop, moves onto a carpet and is caught thereon.

As another example, the controller 10 may determine the material of the floor based on the distance to the floor obtained by the cliff sensor 23a and the bottom-view image information obtained by the optical flow sensor 23b. Specifically, when the distance to the floor obtained by the cliff sensor 23a is less than a reference distance value, the controller 10 may control the mop motor to perform the entry restriction operation. In this case, the controller 10 may determine the material of the floor based on the bottom-view image information acquired by the optical flow sensor 23b.

When the distance to the floor obtained by the cliff sensor 23a is greater than the reference distance value and less than the maximum value, the controller 10 may control the mop motor such that the mobile robot travels normally.

The cliff sensor 23a is disposed at the front end of the body, and detects the height difference between a floor (reference floor), with which the spin mop is in contact, and a floor below the front end of the body. It is possible to sense a cliff and to detect a floor higher than the reference floor using the value detected by the cliff sensor 23a. When a floor higher than the reference floor is detected, the mobile robot determines that there is a carpet or the like on the floor, and avoids the same.

It is possible to reduce an error in determining the material of the floor due to the use of multiple measurement devices such as the cliff sensor 23a and the optical flow sensor 23b.

As still another example, the mobile robot may determine that the current location is within a troublesome region in the state in which a part of the spin mop has entered the troublesome region.

The controller 10 may control the mobile robot 1 based on a mop load value detected by the mop load information sensor 29. Specifically, when the mop load value detected by the mop load information sensor 29 is larger than a predetermined reference load value, the controller 10 may control the mop motor 61 to perform the entry restriction operation.

In addition, when the mop load value detected by the mop load information sensor 29 is smaller than the predetermined reference load value, the controller 10 may control the mop motor 61 to perform the normal travel operation.

As still another example, the controller 10 may calculate an average acceleration value based on acceleration values, and, upon determining that the average acceleration value is larger than a predetermined reference average acceleration value, may control the mop motor to perform the entry restriction operation. In addition, the controller 10 may calculate dispersion of the acceleration values, and, upon determining that the dispersion is greater than predetermined reference dispersion, may control the mop motor to perform the entry restriction operation.

Of course, when the average acceleration value is larger than the reference average acceleration value, the controller 10 may control the mop motor to perform the normal travel operation. In addition, when the dispersion is less than the reference dispersion, the controller 10 may control the mop motor to perform the normal travel operation.

Accordingly, in the present invention, even if a troublesome region is not determined proactively by the cliff sensor 23a or the optical flow sensor 23b, it is possible to determine whether the current location is within a troublesome region at the beginning of entry into the troublesome region based on a single factor or multiple factors, such as the load of the spin mop and information obtained by the acceleration sensor 28.

In addition, during the movement of the mobile robot, for example, the rotational movement or forward movement thereof, it is possible to quickly determine the risk of catching of a part of the mobile robot on the carpet and to enable the mobile robot to rapidly avoid the same.

As still another example, when at least one of Conditions 4 to 7 below is satisfied, the controller 10 may control the mop motor to perform the entry restriction operation.

The load value of the mop motor is larger than a predetermined reference load value     <Condition 4>

| The distance to the floor is less than a predetermined reference distance value | <Condition 5> |

| The average acceleration value is larger than a predetermined reference average acceleration value | <Condition 6> |

| The dispersion of acceleration is greater than reference dispersion | <Condition 7> |

As still another example, when at least one of Conditions 1 to 7 is satisfied, the controller 10 may control the mop motor to perform the entry restriction operation. Accordingly, the present invention is capable of comprehensively and accurately determining whether the material of the floor is a troublesome material based on various factors.

Figure 5:
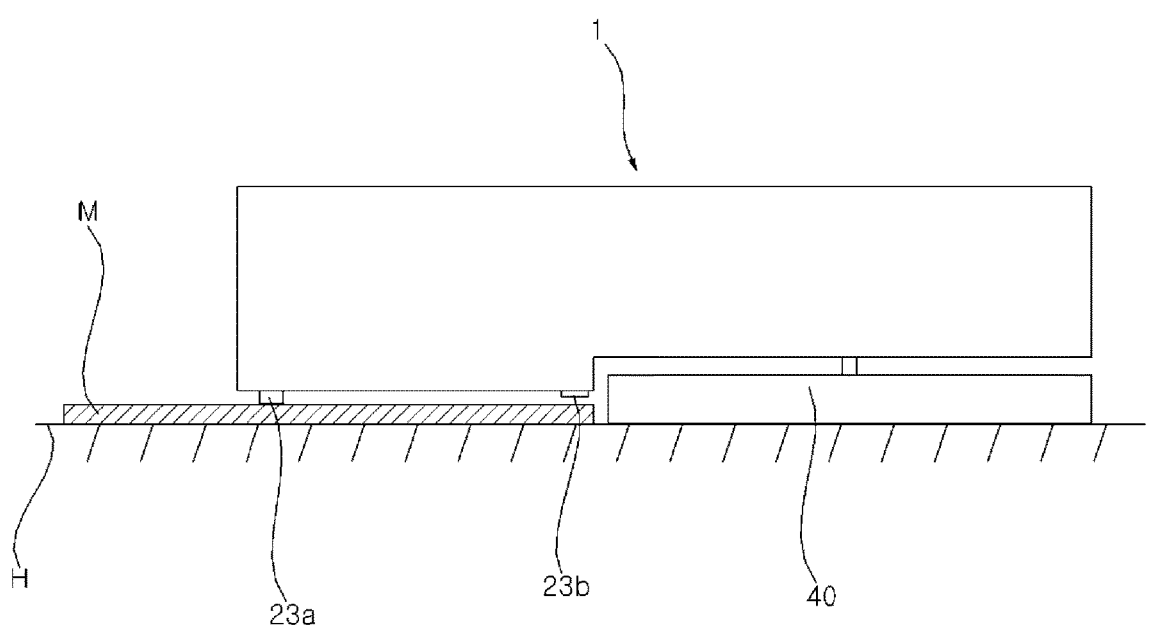
FIG. 5 is a view showing the state in which a part of the mobile robot according to the present invention is moving onto a carpet.

FIG. 5 illustrates the case in which the mobile robot (the cliff sensor 23a and/or the optical flow sensor 23b) moves partway onto a carpet M. In the present invention, in the case in which the mobile robot moves partway onto a carpet or very closely approaches a carpet, the mobile robot is capable of avoiding the carpet. At this time, since the spin mop is still in contact with the floor H, the mobile robot is capable of avoiding the carpet.

Hereinafter, methods of controlling the mobile robot 1 according to first to fourth embodiments will be described. In the flowcharts, the same contents are denoted by the same reference numerals, and a duplicate description thereof will be omitted.

The control method may be performed by the controller 10. The present invention may be a control method of the mobile robot 1, or may be the mobile robot 1 including the controller 1 that implements the control method. The present invention may be a computer program including each process of the control method, or may be a recording medium storing a program that implements the control method using a computer. The "recording medium" is a computer-readable recording medium. The present invention may be a cleaner control system including both hardware and software.

Each process in the flowcharts of the control method and combinations of the flowcharts of the control method may be implemented by instructions from a computer program. The instructions may be installed in a general-purpose computer or a special-purpose computer. The instructions generate means of performing the functions described in the process (es) in the flowchart.

In addition, in some embodiments, functions mentioned in the processes may be implemented in a sequence different from that mentioned herein. For example, two consecutive processes may be performed substantially simultaneously, or may be performed in reverse sequence depending on the corresponding functions.

Referring to FIG. 6, the control method according to the first embodiment is a macroscopic control method of a mobile robot. The control method of the present invention may include a step of obtaining, by the mobile robot 1, information about the floor using various devices (S100), a step of determining the material of the floor based on the information about the floor collected using the various devices (S200), and a step of controlling movement of the mobile robot based on the material of the floor (S300).

Hereinafter, control methods according to second to fourth embodiments will be described in detail with reference to FIGS. 7 to 9.

Figure 7:
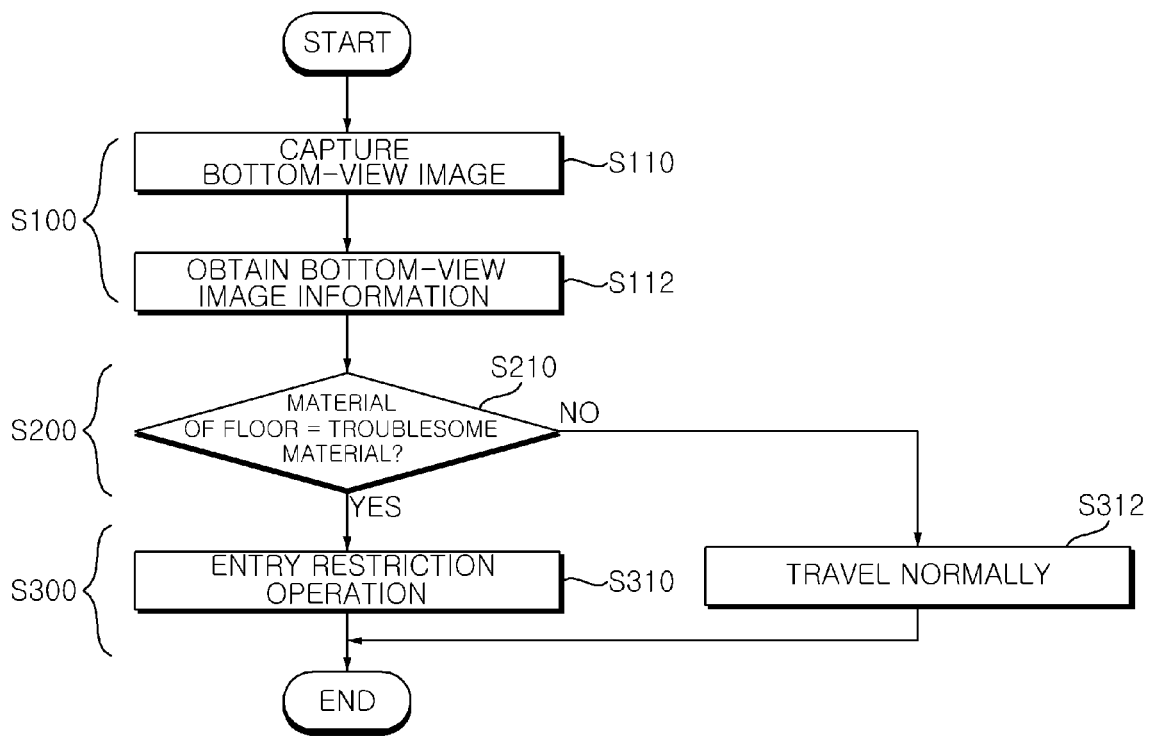
FIG. 7 is a flowchart showing a control method of the mobile robot according to a second embodiment of the present invention.

Referring to FIG. 7, a control method according to the second embodiment may include a step of obtaining, by the mobile robot 1, information about the floor (S100), a step of determining the material of the floor based on the information about the floor collected using various devices (S200), and a step of controlling movement of the mobile robot based on the material of the floor (S300).

Here, the step of obtaining the information about the floor (S100) may include a step of capturing, by the mobile robot, a bottom-view image (S110) and a step of obtaining, by the mobile robot, bottom-view image information from the bottom-view image (S112). Specifically, the step of obtaining the information about the floor (S100) is performed by the optical flow sensor 23b.

The step of determining the material of the floor based on the information about the floor (S200) includes a step of determining that the material of the floor is a troublesome material based on the bottom-view image information (S210). In step S210, the mobile robot and/or the controller 10 determines the material of the floor based on the bottom-view image information obtained through the optical flow sensor 23b. Specifically, the controller 10 may calculate, based on the bottom-view image information, at least one of a floor reflectance value, an image quality value of the bottom-view image, or a frame rate of the bottom-view image, and may determine that the material of the floor is a troublesome material when at least one of Conditions 1 to 3 is satisfied. The concrete determination method is the same as described above.

The step of controlling movement of the mobile robot (S300) includes a step of controlling the mobile robot to perform an entry restriction operation when the material of the floor is a troublesome material (S310). In step S310, the controller 10 may change the travel direction of the mobile robot to left or right, or may move the mobile robot backwards and then change the travel direction thereof, and may perform step S100 again.

In addition, the step of controlling movement of the mobile robot (S300) may include a step of controlling the mobile robot to travel normally when the material of the floor is not a troublesome material (S312). Specifically, the controller 10 may determine whether the material of the floor is a troublesome material, and, upon determining that the material of the floor is a troublesome material, may control the mop motor to perform the entry restriction operation.

Figure 8:
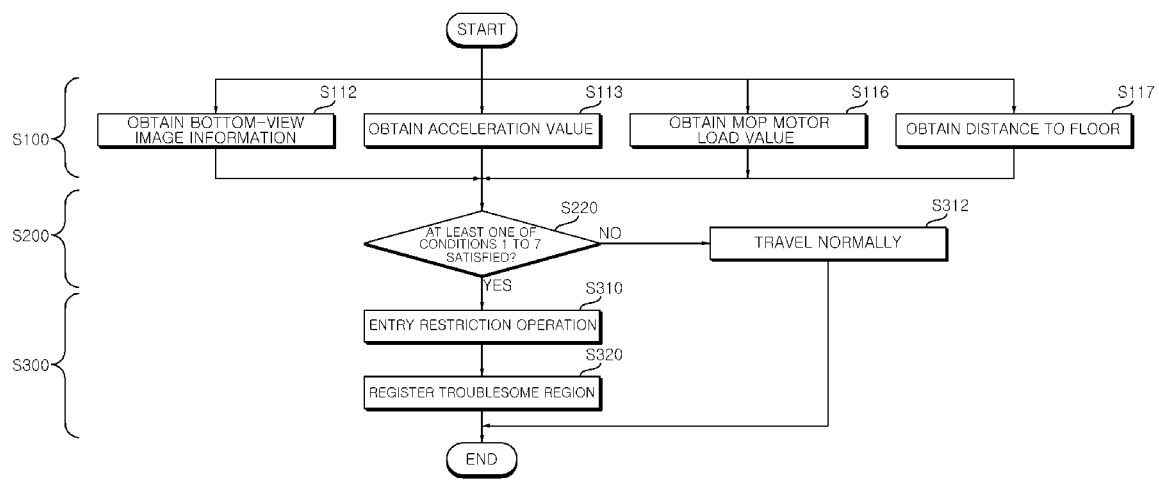
FIG. 8 is a flowchart showing a control method of the mobile robot according to a third embodiment of the present invention.

Referring to FIG. 8, a control method according to a third embodiment may include a step of obtaining, by the mobile robot 1, information about the floor (S100), a step of determining the material of the floor based on the information about the floor collected using various devices (S200), and a step of controlling movement of the mobile robot based on the material of the floor (S300).

Here, the step of obtaining the information about the floor (S100) may include a step of obtaining, by the optical flow sensor 23b, bottom-view image information from the bottom-view image (S112), a step of obtaining, by the acceleration sensor 28, an acceleration value of the mobile robot (S113), a step of obtaining, by the mop load information sensor 29, a mop motor load value (S116), and a step of obtaining, by the cliff sensor 23a, a distance value between the floor and the mobile robot (S117).

The step of determining the material of the floor (S200) includes a step of determining, by the controller 10, that the material of the floor is a troublesome material when at least one of Conditions 1 to 7 is satisfied (S220). Of course, before determining the material of the floor, the controller 10 may calculate an average acceleration value based on acceleration values, and may calculate dispersion of the acceleration values. The concrete determination method is the same as described above.

The step of controlling movement of the mobile robot (S300) includes a step of controlling the mobile robot to perform the entry restriction operation when the material of the floor is a troublesome material (S310). In addition, the step of controlling movement of the mobile robot (S300) may include a step of controlling the mobile robot to travel normally when the material of the floor is not a troublesome material (S312). Specifically, the controller 10 may determine whether the material of the floor is a troublesome material, and, upon determining that the material of the floor is a troublesome material, may control the mop motor to perform the entry restriction operation.

In addition, the step of controlling movement of the mobile robot (S300) may include a step of registering, by the mobile robot, the current location and/or the surrounding region as a troublesome region on the map when it is determined that the material of the floor is a troublesome material (S320).

Figure 9:
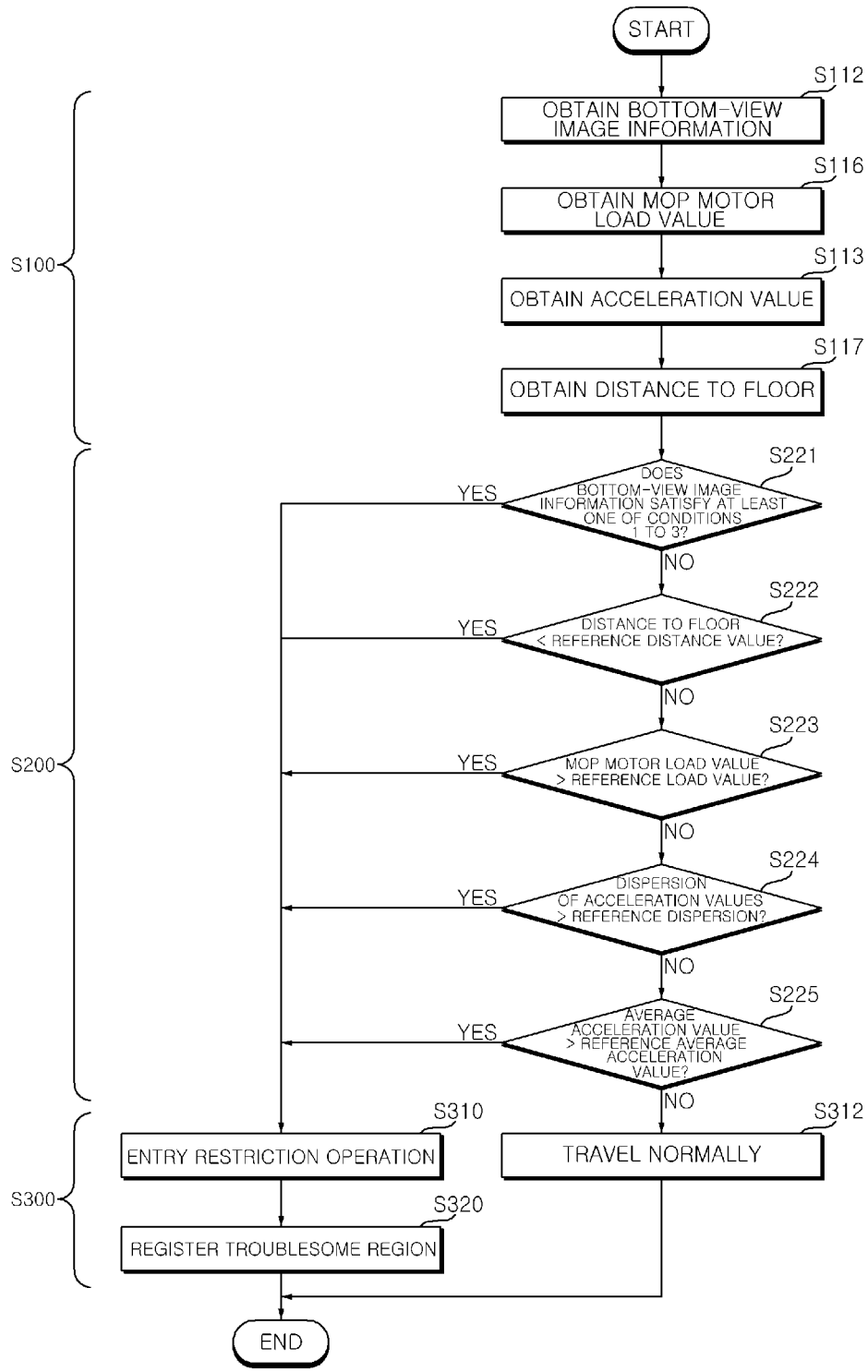
FIG. 9 is a flowchart showing a control method of the mobile robot according to a fourth embodiment of the present invention.

Referring to FIG. 9, a control method according to a fourth embodiment may include a step of obtaining, by the mobile robot 1, information about the floor (S100), a step of determining the material of the floor based on the information about the floor collected using various devices (S200), and a step of controlling movement of the mobile robot based on the material of the floor (S300).

Here, the step of obtaining the information about the floor (S100) may include a step of obtaining, by the optical flow sensor 23b, bottom-view image information from the bottom-view image (S112), a step of obtaining, by the acceleration sensor 28, an acceleration value of the mobile robot (S113), a step of obtaining, by the mop load information sensor 29, a mop motor load value (S116), and a step of obtaining, by the cliff sensor 23a, a distance value between the floor and the mobile robot (S117). The step of obtaining the bottom-view image information (S112), the step of obtaining the acceleration value (S113), the step of obtaining the mop motor load value (S116), and the step of obtaining the distance value between the floor and the mobile robot (S117) may be performed individually, independently, at the same time, at different times, in parallel, or in series.

The step of determining the material of the floor (S200) includes a step of determining, by the controller 10, that the material of the floor is a troublesome material when at least one of Conditions 1 to 3 is satisfied (S221). Of course, before determining the material of the floor, the controller 10 may calculate an average acceleration value based on acceleration values, and may calculate dispersion of the acceleration values. The concrete determination method is the same as described above. In the step of determining that the material of the floor is a troublesome material (S221), when it is determined that the material of the floor is a troublesome material, the controller 10 controls the mop motor to perform the entry restriction operation (S310), and when it is determined that the material of the floor is not a troublesome material, the controller 10 determines whether the material of the floor is a troublesome material based on the distance to the floor (S222).

In step S222, when the distance to the floor obtained by the cliff sensor 23a is less than a reference distance value, the controller 10 determines that the material of the floor is a troublesome material. Upon determining that the material of the floor is a troublesome material, the controller 10 may control the mop motor to perform the entry restriction operation (S310). In step S222, upon determining that the material of the floor is not a troublesome material, the controller 10 determines whether the material of the floor is a troublesome material based on the mop motor load value (S223).

In step S223, when the mop load value detected by the mop load information sensor 29 is larger than a predetermined reference load value, the controller 10 determines that the material of the floor is a troublesome material. Upon determining that the material of the floor is a troublesome material, the controller 10 may control the mop motor to perform the entry restriction operation (S310). In step S223, upon determining that the material of the floor is not a troublesome material, the controller 10 determines whether the material of the floor is a troublesome material based on dispersion of the acceleration values (S224).

In step S224, when the average acceleration value is larger than a reference average acceleration value, the controller 10 determines that the material of the floor is a troublesome material. Upon determining that the material of the floor is a troublesome material, the controller 10 may control the mop motor to perform the entry restriction operation (S310). In step S224, upon determining that the material of the floor is not a troublesome material, the controller 10 controls the mobile robot to travel normally (S312).

In addition, the step of controlling movement of the mobile robot (S300) may include a step of registering, by the mobile robot, the current location and/or the surrounding region as a troublesome region on the map when it is determined that the material of the floor is a troublesome material (S320).

What is claimed is:

1. A mobile robot, comprising:
   a body;
   a pair of spin mops rotatably mounted to the body;
   a mop motor configured to provide a driving force to the pair of spin mops;
   an optical flow sensor configured to obtain bottom-view image information using light at a regular time interval; and
   a controller configured to determine whether a material of a floor is a troublesome material based on the bottom-view image information sensed by the optical flow sensor and to control, upon determining that the material of the floor is a troublesome material, the mop motor to perform an entry restriction operation,
   wherein the controller is further configured to calculate a frame rate of a bottom-view image based on the bottom-view image information, and when the frame rate is lower than a predetermined reference frame rate, determine that the material of the floor is a troublesome material.

2. The mobile robot according to claim 1, wherein the optical flow sensor is disposed further forwards than the pair of spin mops.

3. The mobile robot according to claim 1, wherein the optical flow sensor comprises:
   an image sensor configured to capture the bottom-view image to obtain the bottom-view image information; and
   at least one light source configured to adjust a quantity of light.

4. The mobile robot according to claim 1, wherein the controller is further configured to calculate an image quality value of the bottom-view image based on the bottom-view image information, and when the image quality value is smaller than a predetermined reference image quality value, determine that the material of the floor is a troublesome material.

5. The mobile robot according to claim 4, wherein the image quality value is determined based on a shape of an image formed on the floor by light emitted from a light source.

6. The mobile robot according to claim 1, wherein the controller is configured to calculate a reflectance value of the floor based on the bottom-view image information, and when the reflectance value of the floor is smaller than a predetermined reference reflectance value, determine that the material of the floor is a troublesome material.

7. The mobile robot according to claim 1, wherein the controller is further configured to calculate, based on the bottom-view image information, a reflectance value of the floor, an image quality value of the bottom-view image, and the frame rate of the bottom-view image, and determine that the material of the floor is a troublesome material when at least one of Conditions 1 to 3 below is satisfied:

the image quality value is smaller than a predetermined reference image quality value     <Condition 1> the frame rate is lower than a predetermined reference frame rate     <Condition 2> the reflectance value of the floor is smaller than a predetermined reference reflectance value.     <Condition 3>

8. The mobile robot according to claim 1, further comprising:
a camera or a 3D sensor configured to obtain top-view image information at a regular time interval,
wherein the controller is further configured to detect a current location based on the top-view image information.

9. The mobile robot according to claim 8, wherein, upon determining that the material of the floor is a troublesome material, the controller is further configured to set the current location as a troublesome region.

10. The mobile robot according to claim 1, further comprising:
a mop load information sensor configured to sense a load value of the mop motor,
wherein, when the load value of the mop motor is larger than a predetermined reference load value, the controller is further configured to control the mop motor to perform the entry restriction operation.

11. The mobile robot according to claim 1, further comprising:
a cliff sensor configured to sense a distance to the floor,
wherein, when the distance to the floor is less than a reference distance value, the controller is further configured to control the mop motor to perform the entry restriction operation.

12. The mobile robot according to claim 11, wherein the cliff sensor is disposed further forwards than the pair of spin mops.

13. The mobile robot according to claim 11, wherein the cliff sensor is disposed such that at least a portion thereof overlaps an imaginary central vertical plane in a vertical direction.

14. The mobile robot according to claim 1, further comprising:
an acceleration sensor mounted to the body to sense acceleration values,
wherein the controller is further configured to calculate an average acceleration value based on the acceleration values, and upon determining that the average acceleration value is larger than a reference average acceleration value, control the mop motor to perform the entry restriction operation.

15. The mobile robot according to claim 1, further comprising:
an acceleration sensor mounted to the body to sense acceleration values,
wherein the controller is further configured to calculate dispersion of the acceleration values, and upon determining that the dispersion is greater than reference dispersion, control the mop motor to perform the entry restriction operation.

16. The mobile robot according to claim 1, further comprising:
a mop load information sensor configured to sense a load value of the mop motor;
a cliff sensor configured to sense a distance to the floor; and
an acceleration sensor mounted to the body to sense acceleration values,
wherein, when at least one of Conditions 4 to 7 below is satisfied, the controller is configured to control the mop motor to perform the entry restriction operation:

the load value of the mop motor is larger than a predetermined reference load value     <Condition 4> the distance to the floor is less than a predetermined reference distance value     <Condition 5> an average acceleration value is larger than a predetermined reference average acceleration value     <Condition 6> dispersion of acceleration is greater than predetermined reference dispersion.     <Condition 7>

17. A mobile robot, comprising:
a body;
a pair of spin mops rotatably mounted to the body;
a mop motor configured to provide a driving force to the pair of spin mops;
an optical flow sensor configured to obtain bottom-view image information using light at a regular time interval;
an acceleration sensor mounted to the body to sense acceleration values;
a cliff sensor configured to sense a distance to the floor;
a mop load information sensor configured to sense a load value of the mop motor; and
a controller configured to determine whether a material of a floor is a troublesome material based on information received from at least one of the optical flow sensor, the acceleration sensor, the cliff sensor, or the mop load information sensor and to control, upon determining that the material of the floor is a troublesome material, the mop motor to perform an entry restriction operation,
wherein the controller is further configured to calculate a frame rate of a bottom-view image based on the bottom-view image information, and when the frame rate is lower than a predetermined reference frame rate, determine that the material of the floor is a troublesome material.

18. The mobile robot according to claim 17, wherein the optical flow sensor is disposed at a position further forward than a line connecting rotation axes of the pair of spin mops so as not to vertically overlap the pair of spin mops, and
wherein the cliff sensor is disposed further forwards than front ends of the pair of spin mops and the optical flow sensor.

19. The mobile robot according to claim 17, wherein the pair of spin mops are disposed to be bilaterally symmetrical to each other with respect to an imaginary central vertical plane, and wherein the optical flow sensor and the cliff sensor are disposed so as to vertically overlap the imaginary central vertical plane.

* * * * *